UNITED STATES PATENT OFFICE.

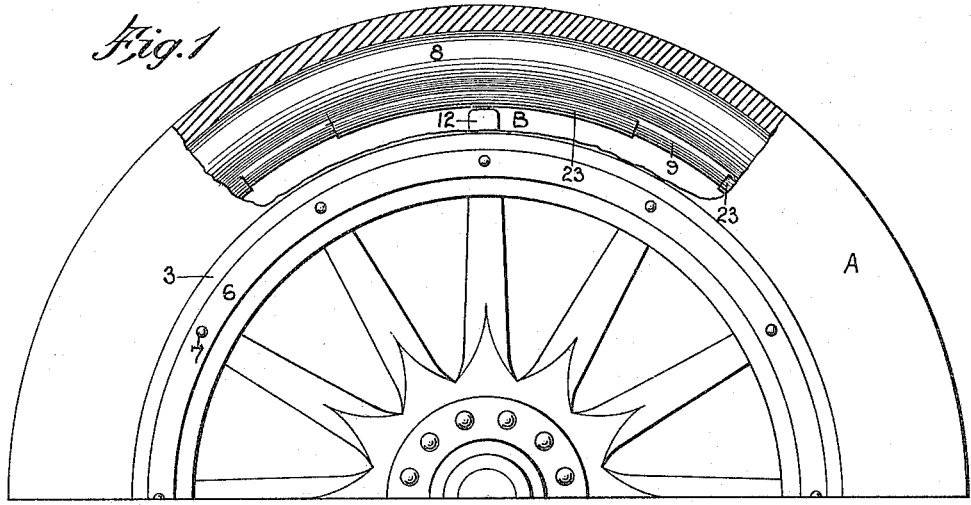
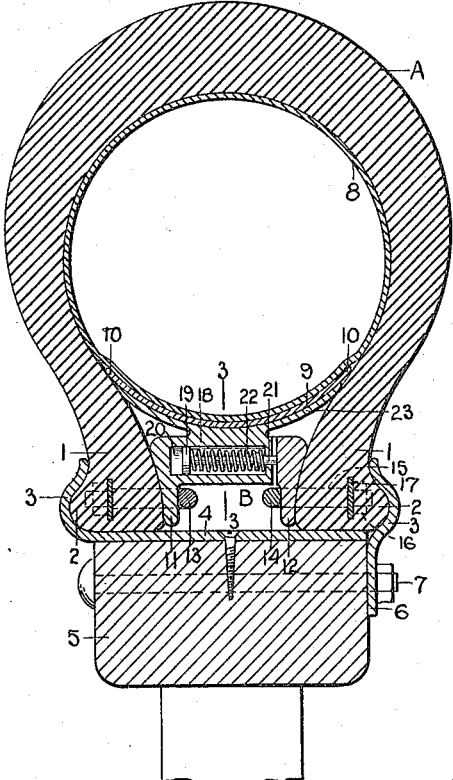
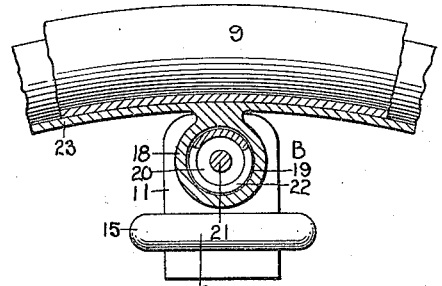
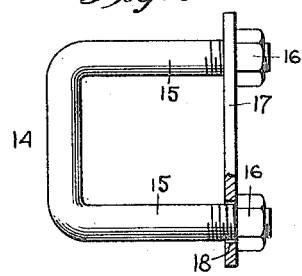
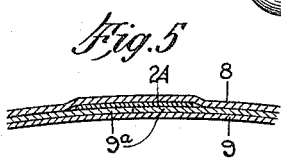

LYNN B. BERNHEIM, OF LOUISVILLE, KENTUCKY.

DETACHABLE TIRE.

1,145,741.   Specification of Letters Patent.   Patented July 6, 1915.

Application filed January 16, 1915. Serial No. 2,633.

*To all whom it may concern:*

Be it known that I, LYNN B. BERNHEIM, a citizen of the United States, and a resident of Louisville, in the county of Jefferson and State of Kentucky, have invented a new and Improved Detachable Tire, of which the following is a full, clear, and exact description.

This invention relates to pneumatic tires of that type in which the shoe with the inner tube inflated can be applied to the felly of the wheel without a demountable rim structure being required to hold the tire in its inflated condition, the advantage being that extra inflated tires may be carried on a car without the necessity of employing demountable rims for each tire.

The invention has for its general objects to improve the construction of vehicle tires of the character referred to so as to be reliable and efficient in use, comparatively simple and inexpensive to manufacture, and so designed that tires may be used on certain types of rims of present design.

A further object of the invention is the provision of a plurality of devices arranged wholly within the shoe for connecting the base or beaded portions of the shoe so that the tube within the shoe can be inflated and the latter applied to a vehicle rim with dispatch and ease.

A further object of the invention is the provision of an annular support on which the inner tube rests so as to keep the tube in proper shape while it contains air under pressure, and under this support are spaced connecting devices which unite opposite sides of the beaded or base portion of the shoe so as to prevent spreading or opening of the shoe when the inner tube is under pneumatic pressure while the shoe is not attached to a wheel.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a fragmentary side view of a vehicle wheel with portions of the tire shoe broken away; Fig. 2 is an enlarged transverse section of the vehicle wheel tire, rim and felly; Fig. 3 is a sectional view on the line 3—3, Fig. 2; Fig. 4 is a plan view of one of the internal loop elements in the base of the tire; and Fig. 5 is a detail view of the joint between the ends of the annular support for the bottom of the inner tube.

Referring to the drawing, A designates a tire shoe or casing which is of the usual form and has its base portions 1 provided with beads 2 to interlock with the rim flanges 3, one flange being formed on a ring 4 which is suitably fastened to the circumference of the wheel felly 5, and the other rim flange 3 is formed on a ring 6 which is secured by bolts or other means 7 to the side of the felly 5. By removing this ring 6 the tire can be detached as a unit in a direction laterally of the wheel.

Within the shoe A is an inner tube 8 of usual form, and in the base portion of the shoe is an annular support 9 made in one or more pieces and in transverse section having a curvature corresponding to the curvature of the inner tube 8 when inflated, the purpose of the support 9 being to support that portion of the inner tube which is not in contact with the internal surface of the shoe at the bottom or base. The edges 10 of the support 9 bear against the sides of the shoe A, and the support 9 coöperates with the internal surface of the shoe to form a chamber of circular cross-section.

By means of the support 9 it merely remains to tie or connect the two base portions 1 of the shoe together to enable the inner tire to be inflated when the shoe is detached from a wheel. For this purpose a plurality of U-shaped connecting devices B are arranged in the base portion of the tire shoe and each device comprises a pair of connected vertical members 11 and 12 which are adapted to enter loops 13 and 14 anchored in the base portions 1 of the tire shoe. Each loop, as shown in Fig. 4, comprises a U-shaped element having its side members 15 threaded to receive nuts 16 which hold a cross-plate 17 on the members 15, which members pass through openings 18 in the plate 17. The plate 17 and the greater portion of the side members of the loop element are embedded in the base of the shoe, and the rest of the loop element projects from the inner surface of the shoe to form a loop. Each connecting device B has its members 11 and 12 yieldingly united. The member 11 has a horizontally extending tubular body 18, in the chamber 19 of which is a piston 20 connected by a rod 21 with the member 12, and on this rod is a stiff helical spring 22 which tends to draw the members 11 and 12 together and allow them to have a limited movement from each other. Each device B is mounted on an arcuate plate 23 which is shaped to conform to the inner tube support 9 under which the plates 23 engage. Thus the devices B by engaging the loops 13 and 14 form additional means for preventing the inner tube from extending toward the base of the shoe.

In Fig. 5 the ends 9ª of the inner tube support 9 are covered by a yielding fabric 24 so as to prevent wear on the inner tube 8.

In assembling the parts the inner tube is first placed in the shoe and then the support 9. The several devices B are then inserted one after another, each device B having its members 11 and 12 engaged with a pair of complementary loops 13 and 14 of the tire shoe. The inner tube is now inflated to the desired pressure and the tire is ready to be assembled on the wheel. The connecting devices B for the lateral base portions of the tire shoe enable the usual rim of a demountable tire to be dispensed with.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. The combination of a tire shoe, a pneumatic tube therein, U-shaped devices arranged within the shoe for connecting opposite sides thereof together and composed of yieldingly connected parts, and a support interposed between the said devices and pneumatic tube.

2. The combination of a tire shoe having internal members anchored respectively to the opposite portions of the base, U-shaped devices each composed of two parts movable toward and from each other and each device being detachably engaged with the two oppositely disposed members, one part of each device having an arcuate member, and an inner tube disposed in the shoe and having portions supported by said arcuate members.

3. The combination of a tire shoe, a pneumatic tube therein, a support arranged in the base portion of the tire for supporting the tube, and a plurality of connecting devices disposed in the shoe and under the support and detachably engaged with opposite sides of the shoe at the base for preventing spreading of the shoe base when the tube is inflated, each device comprising parts yieldingly connected and movable toward and from each other.

4. The combination of a tire shoe, internal loops anchored in the side portions of the base of the shoe, connecting devices engaged with the loops for preventing the base of the shoe from spreading open, a pneumatic tube in the shoe, a ring disposed in the shoe and forming a support for the pneumatic tube, and arcuate plates on the said devices bearing against and engaging the under side of the ring.

5. The combination of a tire shoe, internal members extending toward each other from opposite sides of the base portion of the shoe, and U-shaped connecting elements engaged with each pair of oppositely disposed members, said elements being longitudinally yieldable in a direction transverse of the tire, and also being disposed within the base of the latter.

In testimony whereof I have signed my name to this specification in the presence of two subscribing witnesses.

LYNN B. BERNHEIM.

Witnesses:
Jos. Taustine,
Lewis W. Cohn.

Copies of this patent may be obtained for five cents each, by addressing the "Commissioner of Patents, Washington, D. C."